(12) United States Patent
Wilson

(10) Patent No.: US 7,870,332 B2
(45) Date of Patent: Jan. 11, 2011

(54) RETENTION OF FUNCTIONALITY AND OPERATIONAL CONFIGURATION FOR A PORTABLE DATA STORAGE DRIVE

(75) Inventor: Christopher S. Wilson, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1056 days.

(21) Appl. No.: 11/339,153

(22) Filed: Jan. 25, 2006

(65) Prior Publication Data

US 2006/0173969 A1 Aug. 3, 2006

Related U.S. Application Data

(60) Provisional application No. 60/648,648, filed on Jan. 31, 2005.

(51) Int. Cl.
  G06F 12/00 (2006.01)
  G06F 13/00 (2006.01)
  G06F 13/28 (2006.01)

(52) U.S. Cl. ............... 711/111; 711/100; 711/112; 711/115

(58) Field of Classification Search .......... None
  See application file for complete search history.

(56) References Cited

U.S. PATENT DOCUMENTS

| | | | |
|---|---|---|---|
| 6,012,145 A | 1/2000 | Mathers et al. | |
| 6,012,146 A * | 1/2000 | Liebenow | 726/17 |
| 6,108,759 A * | 8/2000 | Orcutt et al. | 711/173 |
| 6,799,255 B1 | 9/2004 | Blumenau et al. | |
| 7,424,592 B1 * | 9/2008 | Karr et al. | 711/203 |
| 2003/0028765 A1 | 2/2003 | Cromer et al. | |
| 2003/0227939 A1 | 12/2003 | Yukie et al. | |
| 2004/0088513 A1 | 5/2004 | Biessener et al. | |
| 2004/0117576 A1 | 6/2004 | Kobayashi et al. | |
| 2004/0160932 A1 | 8/2004 | Yegoshin | |
| 2005/0027978 A1 * | 2/2005 | Neuman et al. | 713/2 |

FOREIGN PATENT DOCUMENTS

EP 1453060 A 9/2004

* cited by examiner

*Primary Examiner*—Sanjiv Shah
*Assistant Examiner*—Marwan Ayash
(74) *Attorney, Agent, or Firm*—McAndrews, Held & Malloy, Ltd.

(57) ABSTRACT

Various aspects of the invention provide a system and method of operating a data storage drive using any one of one or more data storage devices. In a representative embodiment, a data storage device may be used in a data network and may be referred to as a network attached storage device. Aspects of the invention insure that a data storage drive that that is transferred from a first data storage device to a second data storage device retains the same operational functionality it had when its was operated from the first data storage device.

15 Claims, 11 Drawing Sheets

| Data Pool Name 1104 | 1st Zero Pad. 1108 | Unique Pool ID 1112 | NAS ID 1116 | 2nd Zero Padding 1120 | Creation Time/Date Stamp 1124 | 3rd Zero Padding 1128 | Stripes Field 1132 | Mirrors Field 1136 | Spares Field 1140 | Panes Field 1144 | Chunks Field 1148 | Chunk ID 1152 | ... |
|---|---|---|---|---|---|---|---|---|---|---|---|---|---|

| Chunk Raid 1156 | Pane Partition Specification 1160 | Chunk Partition Specification 1164 | Resize Flag 1168 | Reverse Prog. 1172 | Forward Prog. 1176 | Old Size 1180 | New Size 1184 | 4th Zero Padding 1188 | Valid Pool Info. 1192 |
|---|---|---|---|---|---|---|---|---|---|

| Data Pool Name 1104 | 1st Zero Pad. 1108 | Unique Pool ID 1112 | NAS ID 1116 | 2nd Zero Padding 1120 | Creation Time/Date Stamp 1124 | 3rd Zero Padding 1128 | Stripes Field 1132 | Mirrors Field 1136 | Spares Field 1140 | Panes Field 1144 | Chunks Field 1148 | Chunk ID 1152 |

| Chunk Raid 1156 | Pane Partition Specification 1160 | Chunk Partition Specification 1164 | Resize Flag 1168 | Reverse Prog. 1172 | Forward Prog. 1176 | Old Size 1180 | New Size 1184 | 4th Zero Padding 1188 | Valid Pool Info. 1192 |

FIGURE 11

RETENTION OF FUNCTIONALITY AND OPERATIONAL CONFIGURATION FOR A PORTABLE DATA STORAGE DRIVE

RELATED APPLICATIONS/INCORPORATION BY REFERENCE

This application makes reference to and claims priority from U.S. Provisional Patent Application Ser. No. 60/648,648, entitled "RETENTION OF FUNCTIONALITY AND OPERATIONAL CONFIGURATION FOR A PORTABLE DATA STORAGE DRIVE" filed on Jan. 31, 2005, the complete subject matter of which is incorporated herein by reference in its entirety.

This application makes reference to:

U.S. application Ser. No. 11/049,905, filed Feb. 3, 2005;

U.S. application Ser. No. 11/087,136, filed Mar. 22, 2005; and

U.S. application Ser. No. 11/338,917, entitled "METHOD AND SYSTEM FOR FLEXIBLY PROVIDING SHARED ACCESS TO DATA POOLS" filed Jan. 25, 2006.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When a data storage drive, such as a hard disk drive, is used to store data, a user may wish to use the data storage drive portably at one or more locations. In a representative use, the data storage drive may be used in one or more data storage devices. The one or more data storage devices may be used to house and operate the data storage drive. The data stored in the data storage drive may be accessed and used by one or more computing devices. For example, the data may be conveniently viewed by displaying it onto a suitable monitor or television set. Each of the one or more data storage devices may facilitate the incorporation of additional data storage drives or hard disk drives. On occasion, a user of the one or more data storage devices may wish to incorporate a data storage drive obtained from another data storage device. For example, a data storage drive may be portably transferred from a data storage device used at a workplace to a data storage device used at a home. When this occurs, the configuration data used at the workplace may not be retained and utilized when the data storage drive is used at the home. The configuration data may provide information related to the concatenation of one or more sectors of one or more data storage drives. This configuration data may be used to mount various RAID data pools. The RAID data pools may comprise RAID 0, RAID 1, or RAID 0+1 data pools, for example. The configuration data may also contain metadata associated with access control of certain files. The metadata may comprise one or more passwords and files used to perform administrative control of data pools and data files. Unfortunately, the configuration data may not be available or may not be functional when the data storage drive is moved from one data storage device to another. Thus, one or more data pools that were previously used may not be available when the data storage drive is powered on. Consequently, data that was previously accessible may not be accessible when a data storage drive is transferred from one data storage device to another.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and method of retaining operational functionality when a data storage drive is removed and subsequently operated in an alternate data storage device, substantially as shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 11 is a relational block diagram illustrating the structure of a pool information block in accordance with an embodiment of the invention.

DETAILED DESCRIPTION OF THE INVENTION

Figure 1:
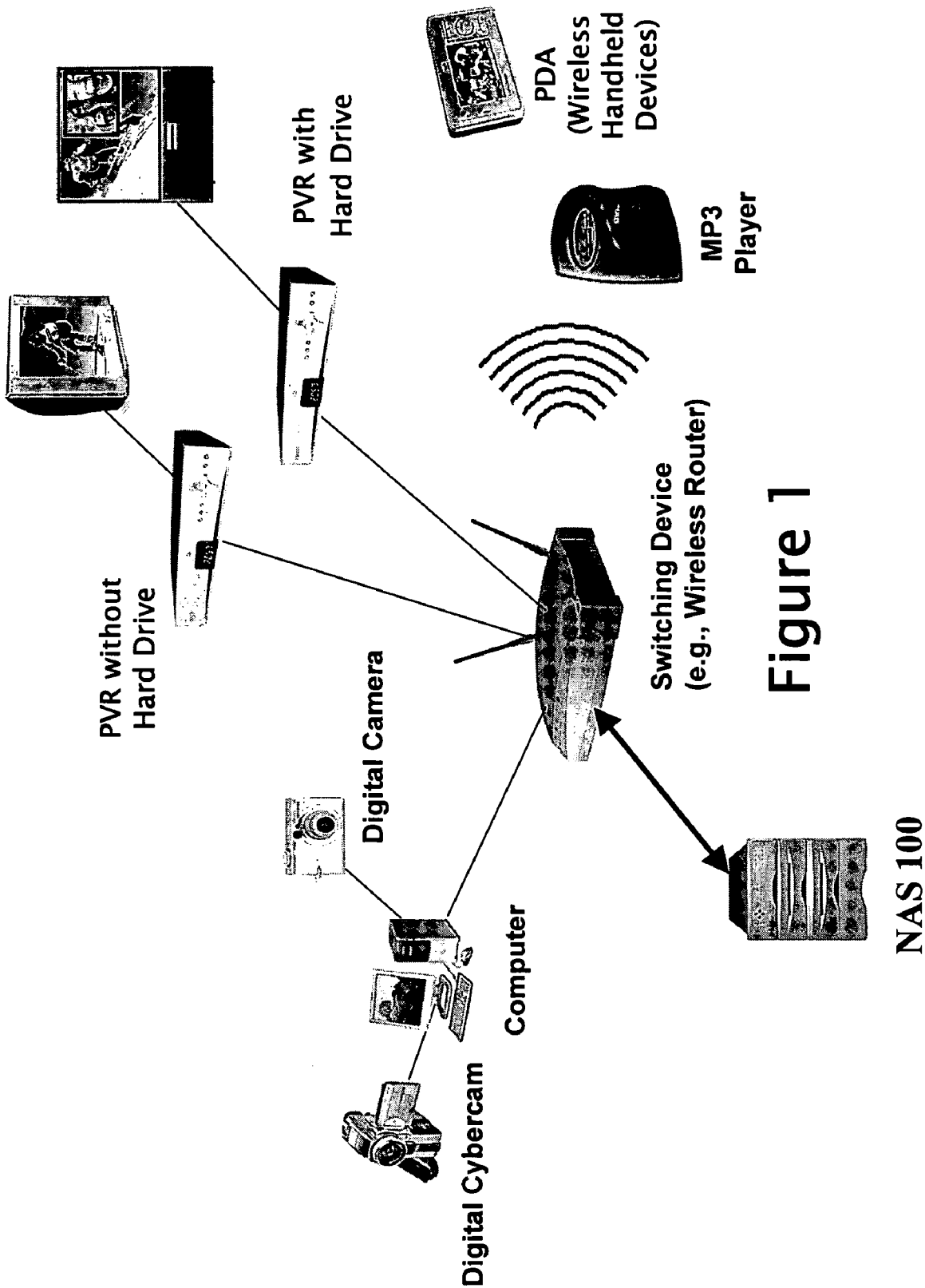
FIG. 1 is a system block diagram of a typical system incorporating the use of a network attached storage device in accordance with an embodiment of the invention.

Various aspects of the invention provide a system and method of operating a data storage drive using any one of one or more data storage devices. In a representative embodiment, the one or more data storage devices comprise one or more data storage devices capable of being networked. The one or more data storage devices may be referred to as network attached storage devices (NAS). Aspects of the invention insure that a data storage drive that is transferred or incorporated into a second data storage device from a first data storage device retains the same operational functionality it had when it was operated from the first data storage device. In a representative embodiment, the operational functionality may comprise the capability of being able to access any of one or more data pools. The one or more data pools may be constructed by way of using the one or more data storage drives. In a representative embodiment, the operational functionality may comprise resuming or suspending access to one or more shares within the one or more data pools using one or more access control mechanisms. Additionally, in a representative embodiment, the operational functionality may comprise using one or more settings previously configured. The one or more settings may comprise one or more administrative parameters such as administrator passwords, share access passwords, disk management parameters, and network parameters that are used for properly configuring a data storage device, using the data storage drive, such that one or more shares and/or one or more data pools may be created, modified, and accessed, for example.

Aspects of the invention allow the data storage drive to retain its functionality when it is operated in another data storage device. The functionality includes using any setting or configuration that was previously used before the data storage drive is moved to another data storage device. Hence, if data from a data pool is accessed when a data storage drive is moved from one data storage device to another data storage device, all of its previous setting or configuration data are retained. In a representative embodiment, configuration data that is used for properly configuring one or more data pools is retained when the data storage drive is operated in one or more other data storage devices. In a representative embodiment, data or metadata associated with one or more administrative functions or one or more security functions associated with a data storage device is completely and identically operational and functional when a data storage drive is removed from a data storage device and incorporated into another data storage device. The metadata, for example, may comprise one or more administrative parameters used in facilitating one or more administrative security (i.e., authentication or verification) functions. The one or more administrative parameters may comprise one or more passwords used to verify the identity of a user who wishes access to the data, for example. The one or more administrative parameters may provide permissions or may facilitate an authorization procedure such that a user may gain shared access to one or more data pools. For example, one or more authorized users may gain access to a data pool of the one or more data pools. For example, one or more authorized users may gain access to a share of a data pool of the one or more data pools. Hence, any administrative parameters utilized in a data storage device are capable of being fully utilized in another data storage device, when the data storage drive is transferred. Thus, any access control or administrative setting or configuration is retained and is fully operational when a data storage drive is transferred from one data storage device to another data storage device.

Various aspects of the invention provide for the retention of one or more mechanisms by which access to a share (or shared directory) may be resumed or suspended to one or more authorized users. A share specific variable may be used to specify whether a particular share access control mechanism (or service) is enabled or disabled. The one or more mechanisms used may involve the following protocols: NFS (i.e., Network File System), CIFS (i.e., Common Internet File System), FTP (i.e., File Transfer Protocol), and HTTP (i.e., Hypertext Transfer Protocol), for example. Each of the one or more mechanisms provides a method by which a share (i.e., or shared directory that provides access to the shared data to one or more authorized users) may be accessed. For example, when CIFS is used as the protocol, a variable termed cifs_enable may be used as the share specific variable for determining if CIFS will provide access to a share (e.g., cifs_enable=YES). Likewise, nfs_enable may be used as the share specific variable for determining whether NFS is used to provide access to a particular share (e.g., nfs_enable=NO). Each of these exemplary variables may be set to a value that controls (i.e., enables or disables) its share access control service; correspondingly each service (i.e., CIFS, NFS, or the like) may provide access to its corresponding share. On the other hand, if either of these variables is set to a value that disables its share access for the associated service, the corresponding service is disabled. In addition to the one or more variables that may be used to enable a particular share access control service, execution of the NAS software may employ the use of one or more default control variables. If, for example, cifs_enable is not defined for a particular share, then its corresponding default control variable, cifs_enable_default, may be used to determine whether or not the share is accessible using the CIFS service. Each share may be associated with a file that comprises the share specific variable database for that share. The share specific variable database may be located within a corresponding data pool of that share. The share specific variable database may comprise a text file containing one or more name-value pairs. For example, share_share#1_cifs_enable may be used as a name while its value may be set to 'enable' (i.e., share_share#1_cifs_enable='enable'). The name may identify the share while the value may provide a flag indicating the state of a particular function or operation associated with the share. The file containing the share specific variable database may be named share_XXX_vars.txt, in which, XXX corresponds to its associated share name. For example, if a particular data pool had shares named Share1, Share2, and Share3, a Reiser file system for this data pool may have corresponding share specific variable database files named share_Share1_vars.txt, share_Share2_vars.txt, and share_Share3_vars.txt, respectively. If a share did not contain a corresponding share_XXX_vars.txt file, the share would be considered to be a share without share variables. The share specific variable database for each share is located within a file external to its share. (For example, the share specific variable database may be located within the corresponding data pool, but outside of the share) In a representative embodiment, this share specific variable database is retained when a data storage drive is transferred from a data storage device into another data storage device. The share specific variable database may be located within the data storage drive. The share specific variable database may comprise one or more data files. In a representative embodiment, the one or more data files may comprise one or more text files. The data storage drive may comprise a hard disk drive, for example. Detailed information describing share specific variables and the implementation of the one or more mechanisms by which access to a share may be resumed or suspended may be found in U.S. patent application Ser. No. 11/338,917, entitled "METHOD AND SYSTEM FOR FLEXIBLY PROVIDING SHARED ACCESS TO DATA POOLS" filed Jan. 25, 2006, the complete subject matter of which is incorporated herein by reference in its entirety.

Each of the one or more data storage devices may communicate or operate with a data computing device such as a personal computer (PC). Each of the data storage devices may function to house and operate one or more data storage drives. Each of the one or more data storage devices may facilitate the incorporation of additional data storage drives or hard disk drives. The data storage device comprises a device that is used to house the one or more data storage drives. A data storage device may be capable of storage expansion by easily incorporating the use of one or more additional data storage drives. The data storage drive may comprise a hard disk drive, for example. One or more data storage drives may be used to provide one or more data pools. The data pools may provide one or more shares or shared directories. The data in the shares may be accessible to one or more authorized users.

Aspects of the invention may utilize coded portions of one or more sections or partitions of one or more hard disk drives such that the partitions may be concatenated to generate one or more data pools. The coded portions comprise data that may reside in one or more headers of the one or more sections or partitions. The information stored within one or more data fields within the headers may be used to map and to access certain data from one or more partitions, such that one or more data pools requested by a user is successfully accessed and retrieved. The data pool may comprise partitions obtained from one or more data storage drives. The headers that are located within each partition, may be referred to as pool information blocks (PIBs), pool information superblocks, or disk superblocks. When a data storage drive is moved from one data storage device to another, the one or more parameters are portably moved or transferred as well, providing the same or identical operational functionality. The coding performed may be redundant and may comprise data stored in one or more fields of one or more headers or one or more partitions in the one or more data storage drives. The one or more fields may comprise a pane partition specifications field in a PIB, for example. A data pool, of course, corresponds to a pooling of one or more partitions over one or more hard disk drives, so as to generate a "logical drive". In a representative embodiment, the header (or PIB) is replicated such that a second header is generated. As such, two PIBs are incorporated into each partition, as a redundancy measure, yielding dual or mirrored PIBs. The data storage drives may be used to store video or multimedia data provided by a cable operator or telecommunications provider. The data storage device may be communicatively coupled to one or more data processing devices (such as personal video recorders (PVRs), PVR ready set-top-boxes, computers, PDAs, digital appliances, and the like), such that the data stored in the data storage device may be transmitted to or received from the one or more data processing devices. For example, the storage device may be connected or attached to a network such that the one or more data processing devices may write to or read from the data storage device. Because of its functionality, the aforementioned data storage device may be referred to as a network attached storage device (NAS). Detailed information concerning the use and structure of pool information blocks (PIBs) may be found in U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005, the complete subject matter of which is incorporated herein by reference in its entirety.

In a representative embodiment, access control settings or configuration data associated with properly configuring one or more data pools, share directories, and administrative access control parameters is stored in flash memory or non-volatile memory. The access control setting or configuration data may be specified using a user interface provided by a web browser such as Microsoft Internet Explorer, for example. In one representative embodiment, the browser is invoked when a user executes a configuration.html file. In another representative embodiment, such configuration data associated with properly configuring one or more data pools, share directories, and administrative access control parameters may be stored in a portion or section of a portable data storage drive. The portable data storage drive may comprise a portable hard disk drive, for example. In a representative embodiment, the portion in which the configuration data is stored comprises a pool information block (or superblock) portion of a hard disk drive. One or more pool information blocks or may be identified as headers in one or more partitions of the hard disk drive, for example. Data pertaining to one or more partition, share, or access control parameters may be stored in the pool information block (PIB) of the hard disk drive. For example, a PIB may comprise a RAID chunk field that is used to specify the RAID chunk size. The RAID chunk size is a parameter that may be used in concatenating one or more partitions when performing mirroring and striping. In a representative embodiment, a partition of a hard disk drive comprises one or more pool information blocks. Detailed information concerning the structure of a hard disk drive used in relation to the present invention may be found in U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005, the complete subject matter of which is incorporated herein by reference in its entirety.

Various aspects of the invention may allow the data storage device to utilize a software and/or firmware, resident within a memory of the data storage device, to facilitate the proper configuration and setup of the one or more data pools/share directories, and the proper operation of one or more administrative access controls. Overall, all necessary configuration data associated with properly configuring one or more data pools, share directories, and administrative access control parameters are stored within one or more portions (e.g., disk header and/or a pool information blocks (or superblocks)) of a data storage drive. In a representative embodiment, the data storage device is termed or referred to as a network attached storage device (NAS). Additional information concerning the network attached storage device (NAS) used in relation to the present invention may be found in U.S. patent application Ser. No. 11/049,905, entitled "DATA STORAGE SYSTEM AND METHOD THAT SUPPORTS PERSONAL VIDEO RECORDER FUNCTIONALITY" filed Feb. 3, 2005, the complete subject matter of which is incorporated herein by reference in its entirety.

In a representative embodiment, a data storage device contains one or more configuration files that are displayed to the user by way of using a Microsoft Windows Explorer application. In a representative embodiment, the one or more configuration files are easily selected and executed by using a mouse on the user interface provided by the Microsoft Windows Explorer application. The one or more configuration files may be selected and executed by way of using the mouse to "point and click" on a file provided by the user interface. When the one or more configuration files are executed, a web browser may be subsequently executed to display a user-friendly graphical user interface. The web browser may comprise Microsoft Internet Explorer, for example. The graphical user interface may provide one or more fields, in which a user may input one or more passwords in order to activate one or more functions and/or operations. The one or more functions and/or operations may comprise creating and editing one or more data pools, for example. The one or more functions and/or operations may comprise creating one or more shared directories capable of being accessed by certain individuals. In a representative embodiment, one or more functions and/or operations may comprise administrative access control parameters such as one or more passwords.

FIG. 1 illustrates a block diagram of a typical system incorporating the use of a network attached storage device (NAS) 100 in accordance with an embodiment of the invention. The exemplary NAS 100 provides data storage for one or more data processing devices. As illustrated, an exemplary switching device provides connectivity of the NAS 100 to the one or more data processing devices. The switching device is capable of providing connectivity using wireless or wireline communications. For example, a wireless router may utilize any one of the following wireless or wireline data communications protocols: 10/100 Ethernet, gigabit Ethernet, 802.11x, Bluetooth, and the like. The one or more data processing devices comprises devices such as a digital cybercam, digital camera, MP3 player, PDA, and one or more personal video recorders (PVRs). As illustrated, the PVR may be equipped with or without a hard disk drive. In one embodiment, the PVR may be referred to as a set-top-box (STB) that incorporates personal video recorder capabilities. In this embodiment, the PVR may be referred to as a PVR-STB. The PVRs illustrated, are connected to a television or a monitor capable of playing multimedia content to a home user. Use of the NAS 100 provides a centralized storage device for multimedia content received by the one or more PVRs. As a consequence of storing content in a NAS 100, PVRs lacking a storage facility, such as a hard disk drive, may store any data it receives into the NAS 100. Further, any data stored by other data processing devices, including PVRs, may be easily accessed and viewed by any of the one or more data processing devices. For example, a PVR without a hard drive may access multimedia content originally stored into the NAS 100 by a PVR with hard drive, and vice-versa. As a result, the NAS 100 facilitates sharing of data among the one or more data processing devices. Since it provides a remote storage mechanism, the NAS 100 may be considered a "virtual storage device" by the one or more data processing devices. The NAS 100 is configured such that its storage capacity may be easily expanded. In a representative embodiment, the NAS 100 may accept additional hard disk drives. In an alternate or complimentary embodiment, the NAS may be configured for expansion, by connecting one or more additional NAS' to the existing NAS. The NAS may be linked together by one or more connectors and wires. As such, the NAS 100 provides an easily scalable and flexible storage mechanism that accommodates for future data storage growth. In addition, the NAS 100 is capable of providing data mirroring and data striping capabilities.

When the NAS is first introduced to the exemplary switching device shown in FIG. 1, one or more of its parameters may be setup as part of an initialization process. In one embodiment, the parameters setup during the initialization process comprises the NAS' time, date, and time zone. The NAS, for example, may utilize the computer illustrated in FIG. 1 as a reference source in setting up its time, date, and time zone. It is contemplated that the NAS may utilize any one of the other data processing devices (e.g., digital cybercam, digital camera, PVR without hard drive, PVR with hard drive, MP3 player, or PDA) shown in FIG. 1 as a reference source in the initialization process.

Figure 2:
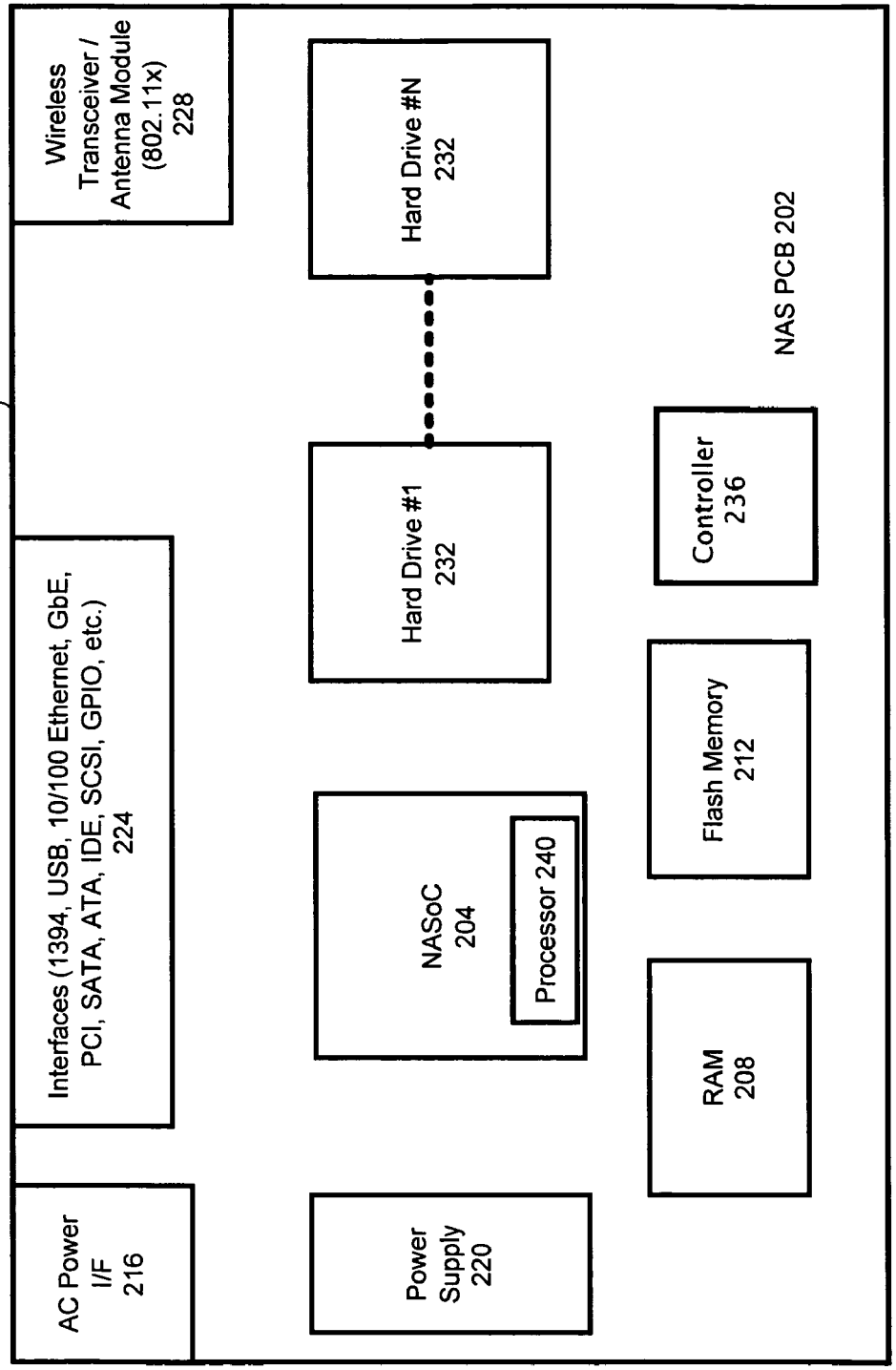
FIG. 2 is a block diagram of a network attached storage device (NAS) in accordance with an embodiment of the invention.

FIG. 2 is a block diagram of a network attached storage device (NAS) 200 in accordance with an embodiment of the invention. The NAS 200 comprises a printed circuit board (NAS PCB) 202 containing one or more components. The one or more components are electrically connected by way of the printed circuit board (PCB) 202. The one or more components comprises a NAS chip (NASoC) 204, which will be described later with respect to FIG. 3, a random access memory 208, a flash memory 212, an AC power interface 216, a power supply 220, one or more interfaces 224, a wireless transceiver/antenna module 228, one or more hard disk drives 232, and a controller 236. The one or more interfaces 224 may comprise the following interfaces: IEEE 1394, USB, 10/100 Ethernet, gigabit Ethernet, PCI, SATA, ATA, IDE, SCSI, GPIO, etc. The wireless transceiver/antenna module 228 may comprise an attachable module or mini-PCI card that may be optionally connected or attached to the NAS' printed circuit board 202. The one or more hard disk drives 232 may comprise any number of hard drives depending on the design of the NAS 200. The printed circuit board 202 may be configured to accommodate an appropriate number of hard disk drives. The number of hard drives utilized may depend on the type of mirroring or data striping (i.e., RAID) provided by the NAS 200. In one embodiment, the controller 236 provides control for any one of several devices connected to the NASoC 204. The NASoC 204 may comprise an integrated circuit chip incorporating a processor or central processing unit (CPU) 240.

One or more methods of accessing data stored in the NAS may be accomplished by the NAS executing a software (or firmware) resident in the NAS. The execution may be controlled and monitored by way of a personal computer (PC) communicatively coupled to the NAS. The software may be downloaded into a memory of the NAS by way of control provided by, for example, the PC or another data processing or computing device. In a representative embodiment, the memory comprises the flash memory described in reference to FIG. 2. As referenced in FIG. 2, the NAS may comprise a motherboard or printed circuit board (PCB) containing the memory in which the software may be stored. In addition, the PCB may incorporate a processor or CPU that performs the execution of the software resident in the memory. In a representative embodiment, the processor or processing circuitry is implemented within the NASoC.

Figure 3:
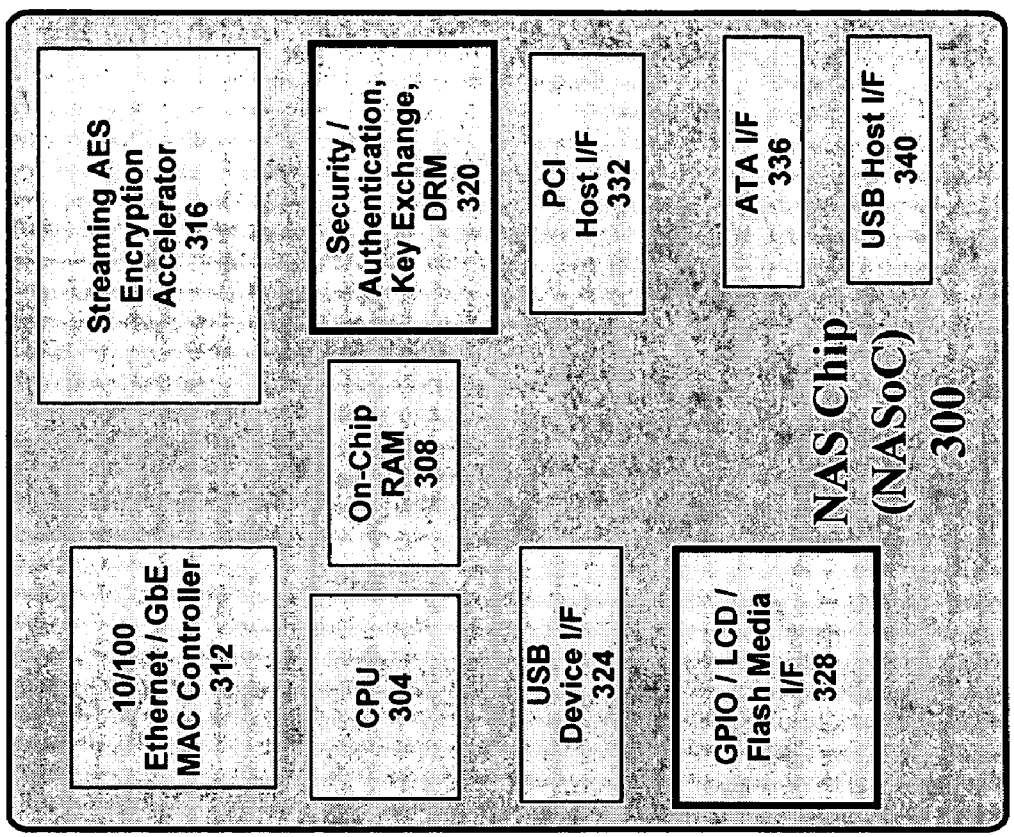
FIG. 3 is a block diagram of a NAS chip (NASoC) in accordance with an embodiment of the invention.

FIG. 3 is a block diagram of a NAS chip (NASoC) 300 in accordance with an embodiment of the invention. The NASoC 300 is an integrated circuit mounted on the previously described NAS PCB. The NASoC 300 provides one or more functions that allow the NAS to properly operate. The NASoC 300 comprises a central processing unit (CPU) 304, an on-chip random access memory 308, a Ethernet/MAC controller 312, an encryption accelerator 316, a security/authentication, key exchange, DRM block 320, and a number of interfaces 324, 328, 332, 336, 340. The interfaces 324, 328, 332, 336, 340 may comprise, for example, the following type of interfaces: USB device I/F 324, a PCI host I/F 332, a GPIO/LCD/flash media I/F 328, an ATA I/F 336, and a USB host I/F 340. The NAS chip 300 (204 in FIG. 2) may communicate and/or connect to the one or more components described in reference to FIG. 2. Referring to FIG. 2, the NAS may incorporate varying numbers of hard disk drives depending on its storage and RAID requirements. The NAS 200 chassis may be configured to incorporate 1, 2, 4, or more hard disk drives depending on type of use. For example, the NAS may utilize 4 hard disk drives for implementing RAID 0+1 (both data mirroring and data striping), suitable for use in a small office/business environment. On the other hand, the NAS may utilize only 1 or 2 hard disk drives in a home (or household) environment since the storage capacity utilized is typically less than that utilized in an office or business environment. Similarly, memory components utilized in the NAS may be varied depending on type of use. As the data storage requirements increase and as the frequency of data storage related requests increase, the performance of the NAS may be improved to meet its operational needs, by way of increasing memory size of the NAS. For example, flash or DRAM memory capacities may be increased in order to improve the processing performance of the NAS. Similarly, the chassis size, power circuitry, and other components may be adjusted to meet the processing requirements of its operational environment.

In a representative embodiment, a NAS may be incorporated into an existing network. The exemplary NAS facilitates generation of a user interface by way of serving one or more files to a data processing device. The NAS may act as an http server, for example, to serve one or more files to the data processing device, such that a user interface is generated at the data processing device. The data processing device acts as a client to the NAS. When served by the exemplary NAS, the user interface is generated at the data processing device such that a user may input one or more values and/or parameters. The user interface may provide one or more fields in which the user may input alphanumeric text. In a representative embodiment, the NAS serves one or more files to a web browser application (i.e., such as Microsoft Internet Explorer, Netscape Navigator, or the like). The browser application resides in a memory (i.e., a storage media such as a hard disk drive) of the data processing device. The browser application generates one or more user interfaces using the one or more files. The one or more files may be executed, for example, by clicking on its filename as displayed by a Microsoft Windows Explorer application. The one or more user interfaces may comprise a user-friendly graphical user interface (GUI). In a representative embodiment, the processor 240 within the NASoC (204 or 300) may execute one or more data files. The processor 240 may execute the one or more data files when a user uses his mouse to execute a configuration.html file that is displayed by a user interface. As previously discussed, the user interface may comprise an application such as Microsoft Windows Explorer. The data files may comprise software or firmware residing within the RAM 208 or flash memory 212. The GUI may display one or more fields in which a user may input alphanumeric values to configure the NAS. For example, the time, time zone, and date may be configured. In a representative embodiment, the software that is executed by the processor 240 comprises a configuration file that is recognized and used by an operating system, such as a Microsoft Windows operating system. The configuration file is capable of being displayed to a user. In a representative embodiment, the initialization process may involve inputting one or more authentication passwords which may be used by a user in the future for accessing and selecting the configuration file. The Microsoft Windows operating system may comprise Windows XP, 2000, ME, 98, Pocket PC, or the like. The user may input the following: a name for the NAS, an administration username, an administration password, time, time zone, date, and network time server internet protocol addresses. One or more embodiments of viewing and utilizing a configuration file may be found in U.S. patent application Ser. No. 11/087, 136, entitled "METHOD AND SYSTEM OF DATA STORAGE CAPACITY ALLOCATION AND MANAGEMENT USING ONE OR MORE DATA STORAGE DRIVES" and filed Mar. 22, 2005, the complete subject matter of which is incorporated herein by reference in its entirety.

In one embodiment, the processor 240 within the NASoC (204 or 300) executes software or firmware (e.g., NAS software) residing within the RAM 208 or flash memory 212 when the NAS is booted up or powered up. The software or firmware comprises a set of instructions capable of being executed by the processor 240. In one embodiment, execution of the software or firmware generates one or more user interfaces, such as graphical user interfaces, allowing a user to configure one or more data pools using portions of one or more hard disk drives. Any configuration data such as one or more configuration parameters may be stored in one or more portions of the one or more hard disk drives. The one or more portions may comprise headers or pool information blocks (PIBs), for example. The configuration data may be used to provide access control to data stored over one or more data pools. The one or more data pools may comprise one or more shares capable of being accessed by one or more authorized users. In order to access a share, a user may input one or more user passwords. The passwords may be stored in a header of the one or more data storage drives or hard disk drives. The processor 240 may execute software or firmware resident in RAM 208 or flash memory 212, such that an access control capability is implemented.

Figure 4:
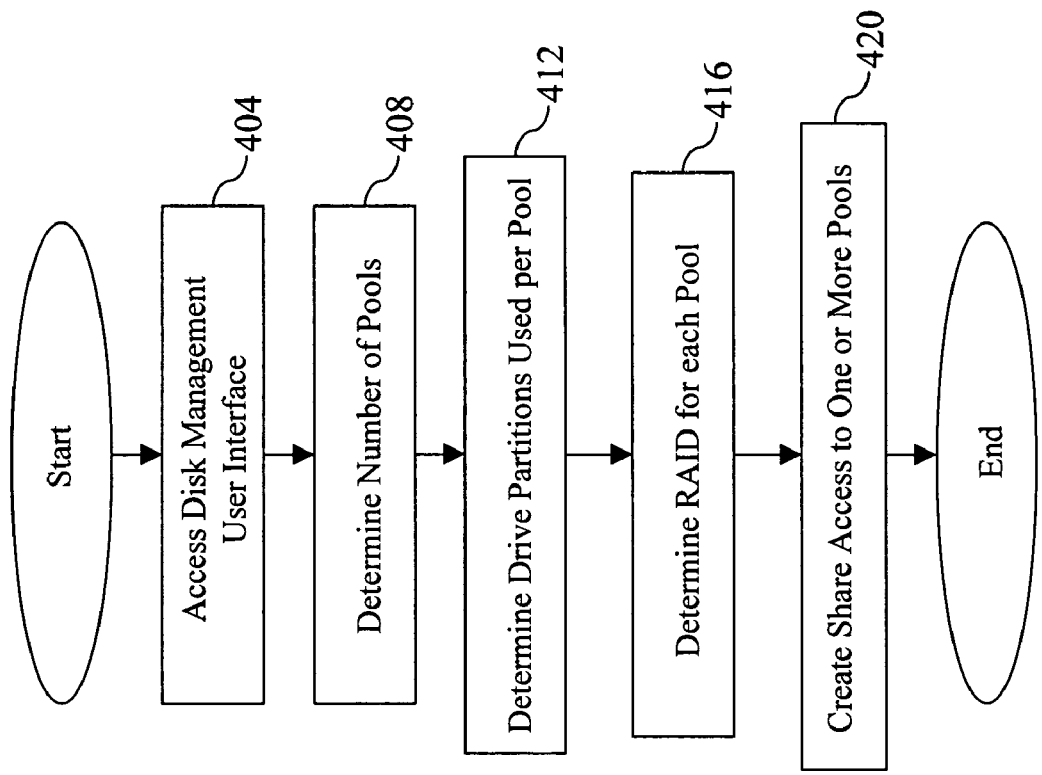
FIG. 4 provides an operational flow diagram illustrating the allocation of pools and the management of one or more hard disk drives within a NAS.
Figure 5:
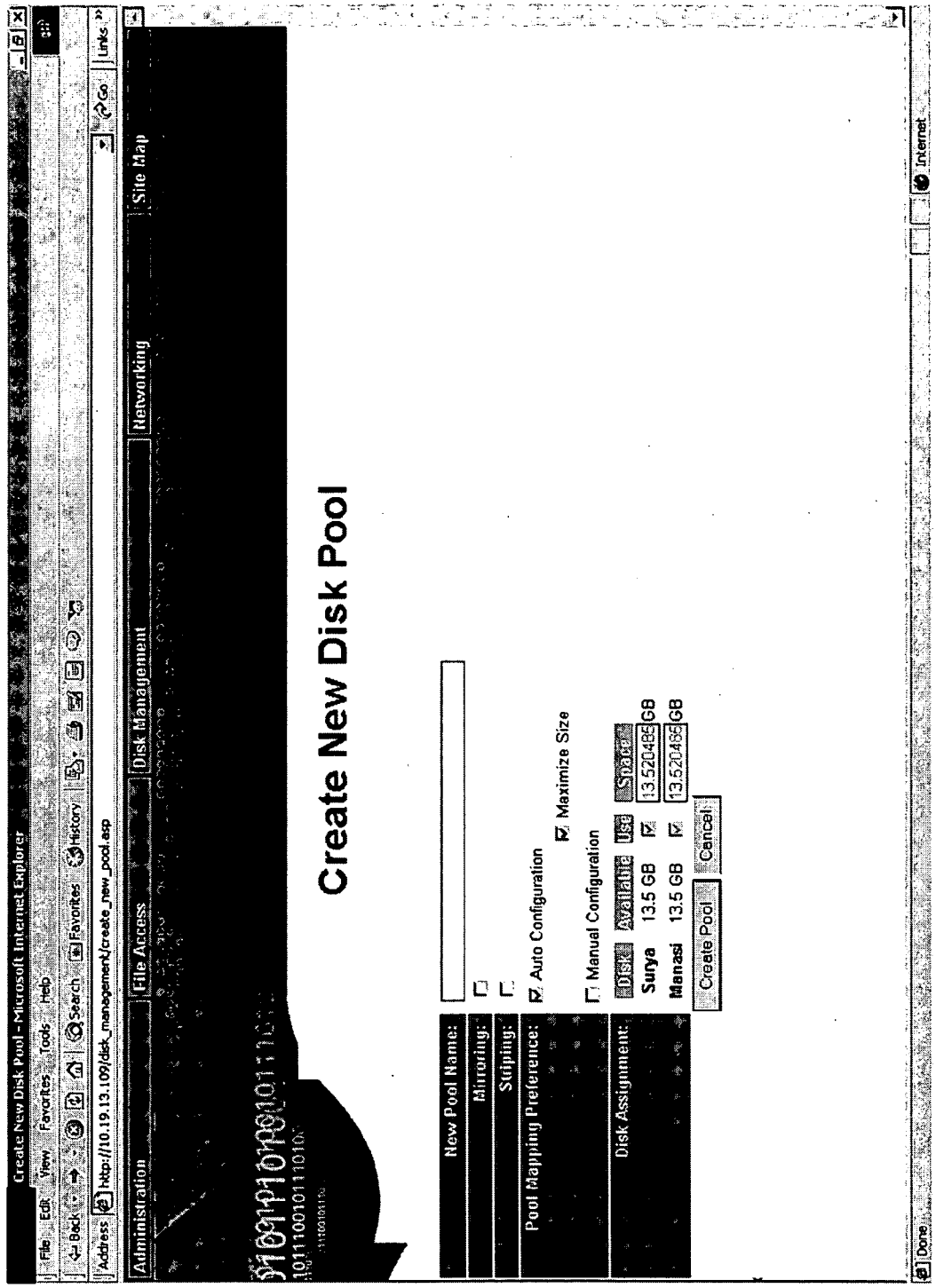
FIG. 5 is an exemplary illustration of a screen shot of a browser, such as Microsoft Internet Explorer or Netscape Navigator, configured to provide an exemplary disk management user interface that allows a user to input one or more new disk pool parameters.
Figure 6:
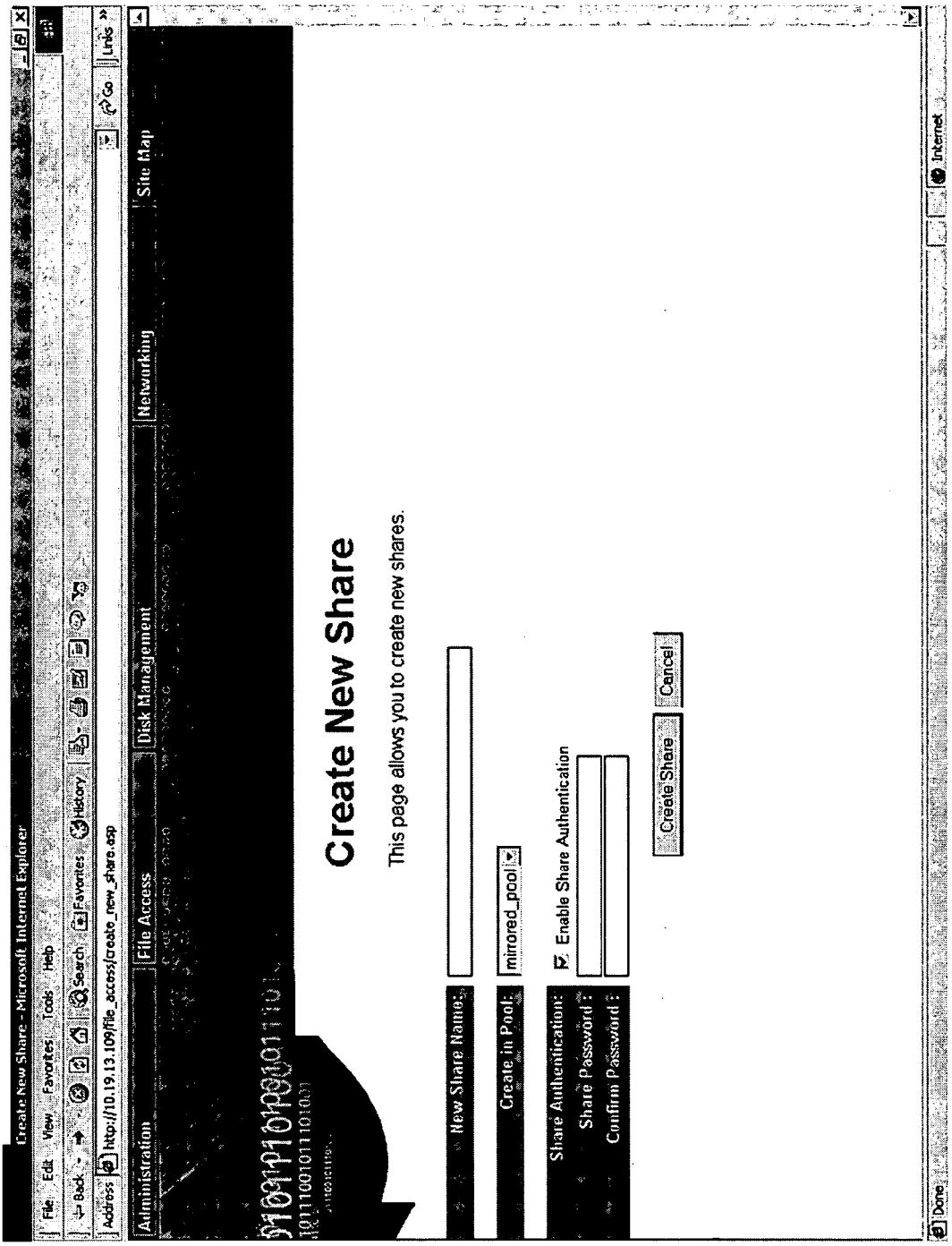
FIG. 6 provides a screen shot of a browser, such as Netscape, that facilitates the creation of shares, for sharing the data stored in a data pool.

FIG. 4 provides an operational flow diagram illustrating the allocation of pools and the management of one or more hard disk drives within a NAS. At step 404, a user accesses the appropriate disk management user interface. In a representative embodiment, the disk management user interface is generated after a user inputs an authorized password into the user interface. In one embodiment, a configuration file is executed in order to generate one or more user interfaces, one of which includes the disk management user interface. FIG. 5 is an exemplary illustration of a screen shot of a browser, such as Microsoft Internet Explorer or Netscape Navigator, configured to provide an exemplary disk management user interface that allows a user to input one or more new disk pool parameters. At step 408 the user determines the number and type of pools to be created. Referring back to FIG. 5, the user may input a new pool name and assign disk drive space (or data storage space) to one or more disk drives provided. FIG. 5 displays two disk drives named Surya and Manasi, each having available capacities of 13.5 Gbytes, in accordance with an embodiment of the invention. The exemplary user interface provides fields in which a user may resize the data pool by way of adjusting the allocation sizes of each of the two disk drives. The user interface also allows a user to determine whether mirroring or striping of the pool is to occur. At step 412, the user may determine the allocations of the one or more drives that contribute to forming a data pool. At step 416, the user may indicate the RAID level for the data pool created. In a representative embodiment, the following RAID levels may be indicated using the user interface: RAID 0, RAID 1, and RAID 0+1. At step 420, one or more shares are created for the one or more pools previously generated. FIG. 6 provides a screen shot of a browser that facilitates the creation of shares for a data pool. A pool comprises disk space that is associated with one or more shares. A share allows one or more users to access space within a data pool. In a representative embodiment, a share may comprise a subdirectory that may contain one or more data files. In a representative embodiment, share access rights may be given to a user when an administrator provides the user with a password. The administrator may configure a password of a share by using the graphical user interface shown in FIG. 6. In a representative embodiment, the user inputs the password in order to access the data stored in the share. If there is more than one share for a pool, the disk space occupied by each share is cumulatively applied against the total space provided by the pool. In a representative embodiment, a share may occupy a portion of a data pool.

Figure 7:
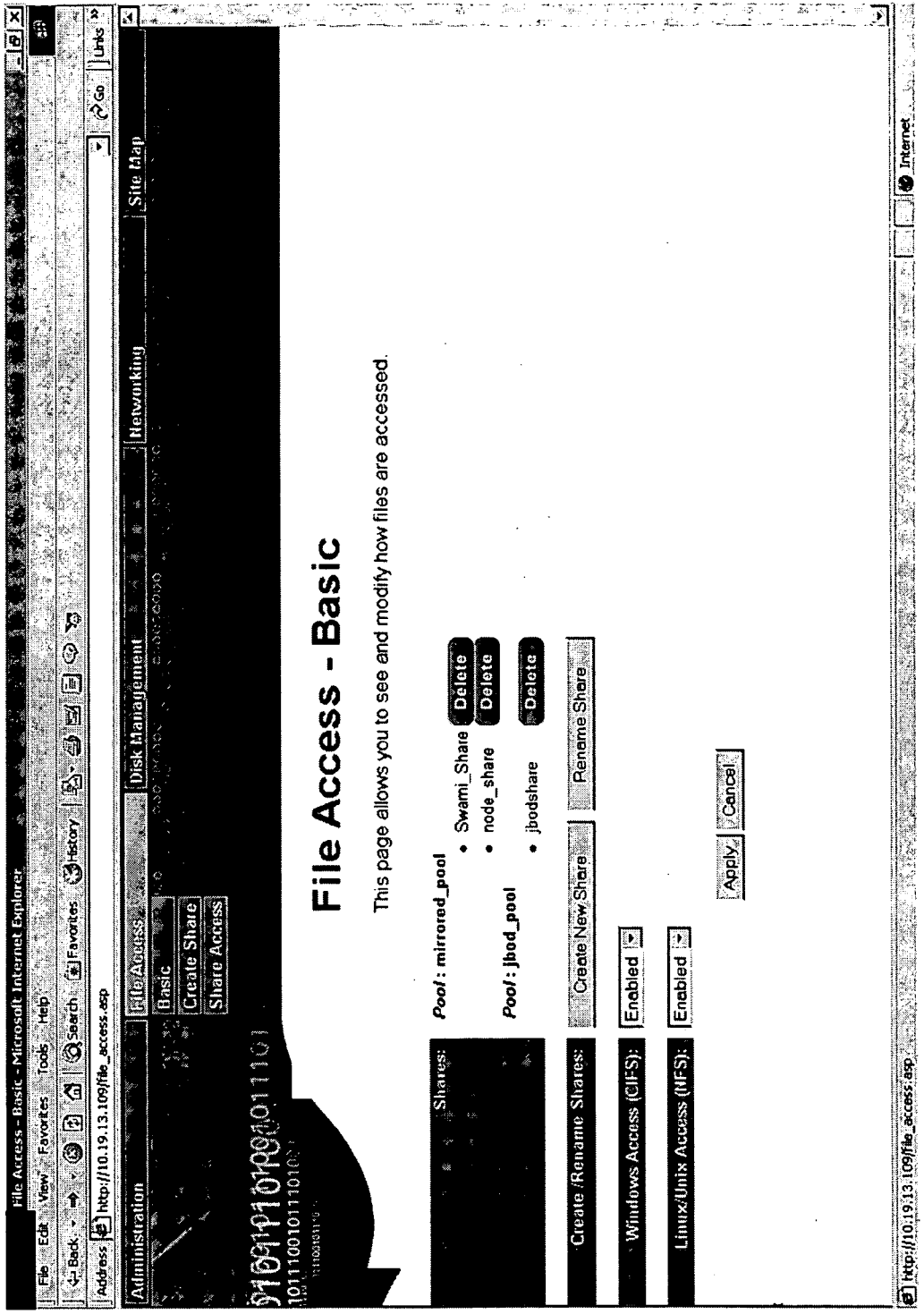
FIG. 7 provides a screen shot of a browser that displays one or more shares associated with one or more data pools.

One or more shares may occupy non-overlapping portions of a data pool, for example. FIG. 7 provides a screen shot of a browser that displays one or more shares associated with one or more data pools and facilitates the creation or deletion of the one or more shares associated with the one or more pools.

Figure 8:
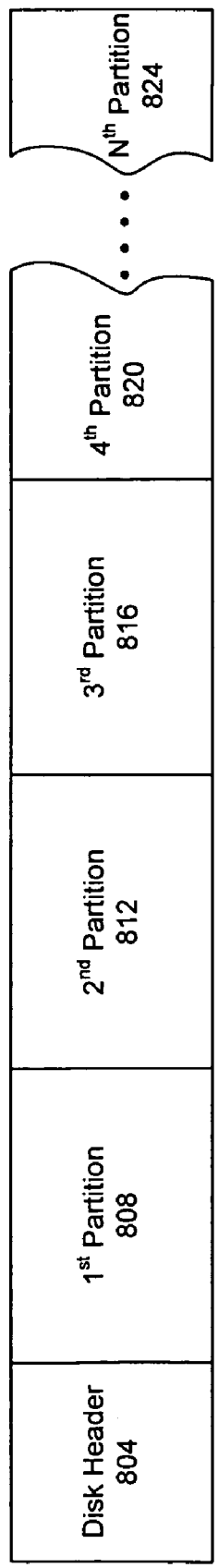
FIG. 8 is a relational block diagram of a structure of a disk or data storage drive that utilizes the file storing mechanism of the present invention, in accordance with an embodiment of the invention.

FIG. 8 is a relational block diagram of a structure of a disk or data storage drive that utilizes the file storing mechanism of the present invention, in accordance with an embodiment of the invention. The beginning of the disk occurs with a fixed-size block called a disk header 804. Additional storage capacity in the form of one or more partitions is represented as blocks 808, 812, 816, 820, 824 in FIG. 8. The nth partition 824 is illustrated as the last partition 824. As illustrated in FIG. 8, a fixed-size block 804 is reserved at the start of every disk or data storage drive for some of the metadata. This fixed-size block 804 is called the disk header 804. The rest of the disk is divided into contiguous, non-overlapping regions called partitions 808, 812, 816, 820, with the disk header 804 specifying, among other things, the start and size of each partition. There may also be some space on any given disk that is not allocated to the disk header 804 or any of the partitions 808, 812, 816, 820, 824; this space may be available for creating new partitions (i.e., when creating new or expanding existing data pools), or extending existing partitions (i.e., when expanding existing data pools). In general, the layout of partitions is determined by one or more partition tables, and there are a number of partition table formats that are used in various systems, such as Linux, Windows, and DOS systems. Various aspects of the present invention allow the formatting of a partition table to vary from conventional systems. Also, in comparison with conventional systems, one or more partition table(s) used in the file storing mechanism of the present invention, is placed in a fixed-size block at the start of the disk or data storage drive. Various aspects of the present invention incorporate dual partition tables in a disk header of the data storage drive. The partition tables are mirror images of each other and are used for redundancy purposes. Dual partition tables are used to protect the integrity of the data stored in the one or more data storage drives when one or more operations are performed. The one or more operations may comprise updating information related to one or more data pools and disk names, for example.

Figure 9:
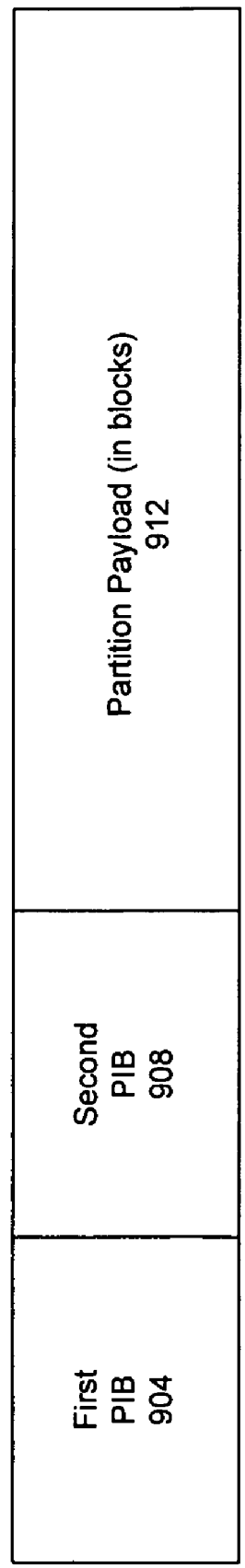
FIG. 9 is a relational block diagram of a partition of a disk or data storage drive in accordance with an embodiment of the invention.

FIG. 9 is a relational block diagram of a partition of a disk or data storage drive in accordance with an embodiment of the invention. As illustrated, each partition comprises three components 904, 908, 912. The first two components are termed the first and second pool information blocks (PIBs) 904, 908, respectively, where each PIB comprises 512 bytes. Each of these PIBs 904, 908 may comprise metadata that is used to construct or concatenate a data pool (i.e., pool metadata). The third and final component is termed the partition payload 912 and may comprise raw data and additional metadata. The size of the partition payload 912 may comprise any number of bytes (or blocks), as specified by a partition table of a disk header. The partition table may specify one or more blocks of a partition. Each of the one or more blocks may comprise 512 bytes. The number of bytes in each of the previously described PIBs or partition payload blocks may vary and other embodiments may be adapted for use in accordance with various aspects of the present invention.

Figure 10:
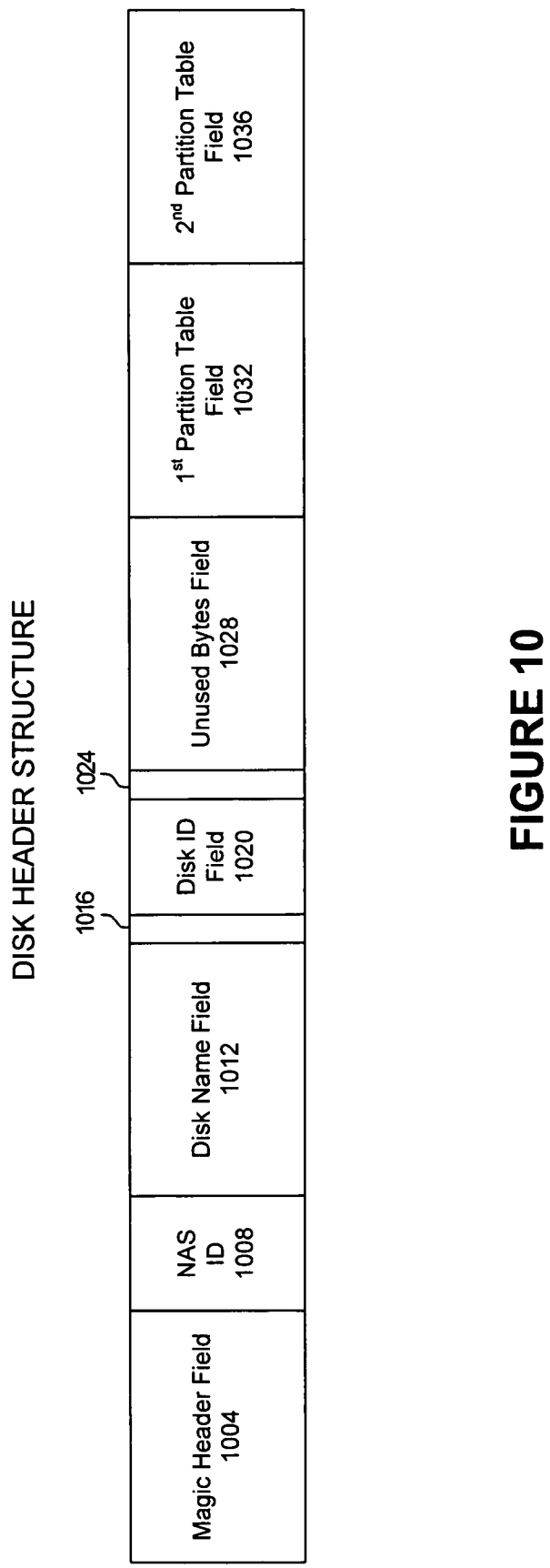
FIG. 10 is a relational block diagram illustrating the structure of a disk header in accordance with an embodiment of the invention.

FIG. 10 is a relational block diagram illustrating the structure of a disk header in accordance with an embodiment of the invention. In this representative embodiment, the disk header comprises 2,560 bytes and comprises the following exemplary fields:

1st field: At offset 0 bytes, a "magic" header field 1004 is used having a length of 34 bytes. This field 1004 contains particular data identifying the associated disk as part of a data pool system used by the low-level part of the disk pool mechanism, in accordance with various aspects of the present invention. Any disk that does not have the first 34 bytes of the disk set to this particular data is not considered part of the data pool system of the file storage mechanism provided by the present invention.

2nd field: At offset 34 bytes, a NAS identifier field 1008 is utilized. A 6 byte identifier is utilized for this field 1008. The six bytes uniquely identify the machine that formatted the disk to create the disk header. In a representative embodiment, the 6 byte identifier identifies a NAS.

3rd field: At offset 40 bytes, a 41 byte disk name field 1012 is utilized. The 41 byte disk name field 1012 may store an ASCII or Unicode string that is human-readable and may be used as an identifying name. In a representative embodiment, the field 1012 may be zero-terminated, wherein every byte after the first zero byte is set equal to zero, so that the last byte must always be zero.

4th field: At offset 81 bytes, 3 bytes of zero padding are used for the zero padding field 1016.

5th field: At offset 84 bytes, a 16 byte identifier is used to identify the disk by way of the disk identifier field 1020. The 16 byte identifier may be generated randomly or semi-randomly when the disk header is created.

6th field: At offset 100 bytes, a one-byte flag utilized in the flag field 1024 may be used to indicate which of two partition tables residing in the disk header is active. For example, a value of zero may indicate that first table is active while any other value may indicate that the second table is active.

7th field: At offset 101 bytes, 411 unused bytes are utilized in the unused bytes field 1028.

8th field: At offset 512 bytes, the first partition table is stored in the 1st partition field 1032. The 1st partition table field 1032 comprises 1024 bytes.

9th field: At offset 1536 bytes, the second partition table is stored in the 2nd partition table field 1036, which also comprises 1024 bytes.

The second, third, and fifth fields of the disk header (e.g., the NAS identifier, the disk name, and the disk unique identifier) may be used to reference a particular disk, insuring that no two different disks might be confused for one another.

In a representative embodiment, at any given time, only one of the two partition tables is made active, by way of the flag used in the one byte flag field 1024. When changes are made to the partition table, any new information is written into the inactive partition table. For example, all inactive partition tables in the one or more data storage drives are updated at the time an update is made. Because the active table is not modified, an inconsistent state is obviated, such as when a write operation is interrupted by a power failure. In this representative embodiment, each partition table comprises 1024 bytes and is divided into 64 entries of 16 bytes each. Each of the 64 entries of the partition table may either specify a partition in a disk. When all 16 bytes in an entry are equal to zero, the entry is considered or referred to as empty. If the entry is not empty, the first 8 bytes of the entry specify the starting block number and the other 8 bytes specify the size in blocks of the partition. The start and the size are specified in terms of 512-byte blocks. In this representative embodiment, the starting block number is relative to the start of the disk and points to the start of the partition payload block of a partition. The size may specify the size (in blocks) of the partition payload. Note that the size does not include the two pool information blocks (PIBs) referred to in FIG. 9. For example, if a partition table specifies a starting block number of 811 and a size of 13 blocks, then the first pool information block PIB for this partition will be block number 809, while the second PIB for this partition will be block number 810. In this representative embodiment, the partition payload will comprise blocks 811 through 823 inclusive. In a representative embodiment, the disk header comprises the first 8 blocks; and as a consequence, the lowest valid value for the starting block number of a partition table entry is 10.

Each partition is associated with two pool information blocks (PIBs) that determine the one or more data pools. There are two PIBs per partition such that while one copy is being modified the other may be accessed. The two PIBs may be referred to as PIB A and PIB B, respectively. The process of updating the PIBs comprises the following exemplary methodology. While all the PIB A copies for all the partitions in the pool are being changed, none of the PIB B copies are changed, such that the PIB B copies will always be in a consistent state if the A copies are not. Similarly, while the PIB B copies are being updated, all the PIB A copies are not modified, such that if the PIB B copies are inconsistent, the PIB A copies will all be consistent. The offsets, byte lengths, and field sizes of the previously described disk header fields may vary and other embodiments may be adapted for use in accordance with various aspects of the present invention.

FIG. 11 is a relational block diagram illustrating the structure of a pool information block in accordance with an embodiment of the invention. In a representative embodiment, each pool information block (PIB) comprises 512 bytes and contains the following exemplary fields:

1st field: At offset 0 bytes, 81 bytes are used for a data pool name field 1104. In a representative embodiment, the data pool name field 1104 is designed to be an ASCII or Unicode string that is human-readable and is used as a name for the data pool associated with this pool information block. In a representative embodiment, the data pool name field may be zero-terminated, with every byte after the first zero byte also equal to zero. As a consequence, the last byte must always be zero in this embodiment.

2nd field: At offset 81 bytes, 3 bytes of zero padding is provided by a first zero padding field 1108.

3rd field: At offset 84 bytes, 16 bytes are used to define a unique data pool identifier in the data pool identifier field (or unique pool I.D. field) 1112. The 16 bytes may be generated randomly or semi-randomly when the pool is created.

4th field: At offset 100 bytes, 6 bytes are used for the NAS identification field 1116 such that the NAS of the machine that created the data pool is identified. This particular value may correspond to the value that is placed in the NAS identifier field 1008 at offset 34 bytes of the disk header, referenced in FIG. 10. As a result, utilizing a unique data pool identifier, a NAS ID, and a creation time stamp may uniquely identify a data pool. In essence, this three-identifier combination is very unlikely to be used by any other pool. If two different data pools were identified by the same unique data pool identifier, NAS ID, and creation time stamp, confusion may exist about what partitions are used to form one or more data pools. For example, any two pools created on the same NAS should have different time stamps and any two pools created on two different NAS' should have different NAS IDs. By using random values for the unique data pool identifier, the likelihood of using the same three-identifier combination decreases. In certain situations, the NAS ID might be different from the NAS ID of the NAS currently using the data pool because one or more data storage drives or disks might have been removed from one NAS and inserted into another. The NAS ID of a data pool information block may be different from the NAS ID in the disk header of a data storage drive or disk used by a data pool if the data storage drive or disk was first used by one NAS while the data pool was subsequently created or generated by another NAS. The NAS ID in the disk header is not changed when the partition tables are updated since the NAS ID in the disk header should correspond to the NAS that first created the disk header on the disk. This allows the NAS ID in the disk header to distinguish itself amongst different disks or data storage drives. Likewise, the NAS ID in the pool information block helps allow different pools to be distinguished.

5th field: At offset 106 bytes, 2 bytes of zero padding are added within a second zero padding field 1120.

6th field: At offset 108 bytes, 9 bytes are used to specify a creation time/date stamp for a data pool specified within the creation time/date stamp field 1124. As with the NAS ID field 1116, the time and date is recorded to help uniquely identify a particular pool and to distinguish a pool from other pools. The first 4 bytes comprise the year, the next byte comprises the month (1-12), the next byte comprises the day of the month (1-31), the next byte comprises the hour (0-23), the next byte comprises the minutes (0-59), while the final byte comprises seconds (0-59). In a representative embodiment, the time/date stamp is expressed in terms of Universal Time.

7th field: At offset 117 bytes, 3 bytes of zero padding are added to a third zero padding field 1128.

8th field: At offset 120 bytes, there are 4 bytes that specify the number of stripes or striped partitions in the data pool. The 4 bytes are located in the stripes field 1132. In a representative embodiment, a value of 1 signifies that striping is not used. For example, there must be at least two stripes for striping to be meaningful. Striping with a single stripe is equivalent to no striping while a value of zero comprises an illegal value.

9th field: At offset 124 bytes, there are 4 bytes that specify the number of mirrors or mirrored partitions in the data pool. These 4 bytes are located in the mirrors field 1136. In a representative embodiment, a value of 1 signifies that mirroring is not used while a value of zero is illegal.

$10^{th}$ field: At offset 128 bytes, 4 bytes specifying the number of spares in the pool is used in the spares field 1140. In a representative embodiment, a value of 0 indicates that no spares are available.

11th field: At offset 132 bytes, there are 4 bytes specifying the number of the pane associated with a partition. 4 bytes are used in the pane field 1144. Panes comprise striping, mirroring, and spare data units that are used to produce or generate an entire data pool. The total number of panes associated with a data pool comprises (NST*(NM*NSP)) where NST comprises the number of stripes or striped panes (at offset 120), NM is the number of mirrors or mirrored panes (at offset 124 bytes above), and NSP is the number of spares or spare panes. In a representative embodiment, the panes in a data pool are numbered from zero to one less than the total number of panes. For example, the panes are numbered starting with all the stripes for the first mirror followed by all the stripes for the second mirror, and so forth and so on. This is followed by all the stripes for the first spare followed by all the stripes for the second spare, and so forth and so on.

12th field: At offset 136 bytes, there are 4 bytes in the chunks field 1148, that specifies the number of chunks in the pane specified in the pane field 1144. Using one or more chunks, a pane may be spread among multiple partitions over one disk (or data storage drive) or across any number of disks. One or more chunks are gathered from all partitions in all disks corresponding to a pane. The chunks are concatenated to form a pane. This chunks field 1148 specifies how many chunks there are in a particular pane. In a representative embodiment, the minimum value of a chunks field is 1.

13th field: At offset 140 bytes, there are 4 bytes comprising a chunk identifier that specifies which chunk is represented in a pane. The chunk identifier is stored in the chunk identifier field 1152. In a representative embodiment, the chunks are numbered from zero to one less than the total number of chunks in the pane. This numbering specifies the order in which the partitions may be concatenated in order to form the pane. The chunk identifier is contained in the chunk identifier field 1148.

14th field: At offset 144 bytes, there are 4 bytes used in the RAID chunk field 1156 that specifies the RAID chunk size. The RAID chunk size is an implementation detail used in the implementation of the code to concatenate partitions and perform mirroring and striping. It maintains the same value for all pool information blocks in a given data pool. Note that the term "chunk" here is not the same as the term "chunk" used in describing the fields at offsets 136 and 140.

15th field: At offset 148 bytes, there are 108 bytes of pane partition specification that determines which partition is used as the next pane of this data pool. A partition specification is populated in a pane partition specification field 1160. The partition specification comprises 81 bytes that specifies the name of the disk on which the partition resides, 1 byte of zero padding, 6 bytes specifying the NAS ID, 16 bytes comprising a disk unique ID for the disk containing the specified partition, and 4 bytes comprising the number of the partition being specified, for a total of 81+1+6+16+4=108 bytes. If the partition associated with the pane partition specification corresponds to the last pane, this pane partition specification field specifies the first pane in the next data pool, so the pane partition specification field provides a link between partitions. Various aspects of the invention provide that should only one pane exist in the data pool, the pane partition specification field 1156 simply refers back to itself, if the partition is the only partition in its pane.

16th field: At offset 256 bytes, there are 108 bytes of chunk partition specification that determines which partition is the next chunk of the pane of this partition. The chunk partition specification is utilized within the chunk partition specification field 1164. Should this partition be the last in the pane, this field points back to the first chunk in the associated pane. So if the pane consists of only a single partition, this field specifies itself.

17th field: At offset 364 bytes, 4 bytes are used in a resize flag field 1168 to indicate whether or not the data pool is currently in the midst of a resizing operation. In a representative embodiment, a value of zero means it is not undergoing a resizing operation. Else, a value of one indicates that it is undergoing a resizing operation. In this embodiment, all other values are considered illegal. In a representative embodiment, the NAS stores information when a resizing operation in progress. This information is used so that if the resizing operation is interrupted, the NAS may restore itself to its state prior to the resizing operation such that its data is not lost or corrupted. For example, the NAS may continue a prior resizing operation by starting from the point where the interruption occurred. Various aspects of the present invention utilize the remaining the fields in the pool information block when a resizing operation is performed on its associated data pool. In a representative embodiment, the validity marker utilized in the last field of the pool information block, is not used in the resizing operation.

18th field: At offset 368 bytes, there are 8 bytes used in the reverse progress field 1172 that indicate how far a resizing operation has progressed in the reverse direction. When resizing a data pool, each partition may grow or shrink in size (including shrinking to zero, for a partition being removed, or growing from zero for a partition being added), so data might have to be moved forward or backward within the pane. The ordering of these data movements is very important in order to prevent overwriting of data. This data shifting or data transfer is performed by first moving forward through the pane while copying data in a reverse direction and then followed by moving backward through the pane while copying data in the forward direction. The 8 bytes are stored in a reverse progress field 172 that specifies the progress that has been made in the reverse direction. If the resize operation is interrupted, the data shifting in the reverse direction is restarted at the correct point based on this field.

19th field: At offset 376 bytes, there are 8 bytes that indicate how far a resize operation has progressed in the forward direction. This is the counterpart to the previously discussed reverse progress field and is measured in terms of the number of bytes progressed in the forward direction. A forward progress field 1176 is utilized here.

20th field: At offset 384 bytes, there are 8 bytes which indicate the old size (in kilobytes) when a resize operation is performed. Note that this may be zero to indicate that the associated partition is being newly added during a resizing operation. The 8 bytes are stored in a old size field 1180.

21th field: At offset 392 bytes, there are 8 bytes used in a new size field 1184 that indicate the new size in kilobytes of the associated partition for a resize operation. Note that this may be equal to zero, indicating that this partition is being removed by the resizing operation.

22nd field: At offset 400 bytes, there are 96 bytes of zero padding stored in the fourth zero padding field 1188.

$23^{rd}$ field: At offset 496 bytes, there are 16 bytes which indicate that the block is a valid pool information block. In a representative embodiment, the 16 bytes are stored in a valid pool information field 1192. There is a binary value that this field 1192 must match for this pool information block to be considered as valid. This ensures that if this pool information block doesn't contain valid pool information block data, it is not interpreted as such. If, for example, this field is absent, the file storage system may ignore the pool information block. The offsets, byte lengths, and field sizes of the previously described pool information block fields may vary and one or more other embodiments may be adapted for use in accordance with various aspects of the present invention.

In a representative embodiment, share information and its associated access control information for each data pool may be stored as a text file within its corresponding data pool. This text file is configured such that it is invisible to a user of a NAS device.

Various aspects of the present invention may utilize the information provided by the one or more aforementioned fields in a PIB to link or concatenate one or more partitions, in the formation of a data pool. The one or more partitions may be located in one or more data storage devices throughout a data network. The information stored in these one or more fields may be retained when a data storage drive, such as a hard disk drive, is transferred from one data storage device to another. For example, the data pool identifier field 1112, the pane partition specification field 1160, and the chunk partition specification field 1164 may be used to link or concatenate the one or more partitions.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method for retaining access to one or more data pools after a data storage drive resident within a first data storage device is communicatively decoupled from said first data storage device and communicatively coupled into a second data storage device, said method comprising using metadata stored within said data storage drive when said second data storage device is operated, wherein said metadata comprises: data located within:
- dual partition tables of said data storage drive, said dual partition tables comprising a first partition table and a second partition table, said first partition table being a mirror image of said second partition table, said dual partition tables used to specify partitions in said data storage drive, wherein either said first partition table or said second partition table is made active by way of a flag located in a disk header of said data storage drive; and
- dual pool information data blocks within each of said partitions, said dual pool information data blocks comprising a first pool information data block and a second pool information data block, said first pool information data block being a mirror image of said second pool information block, said dual pool information data blocks used for identifying and concatenating said partitions to construct each of said one or more data pools, wherein access to said one or more data pools is provided by one or more share access mechanisms based on values of one or more variables of a text file stored within its corresponding data pool.

2. The method of claim 1 wherein said values determine whether said one or more share access mechanisms are enabled or disabled.

3. The method of claim 2 wherein said one or more share access mechanisms employs the use of a network file system protocol.

4. The method of claim 2 wherein said share access mechanism employs the use of a file transfer protocol.

5. The method of claim 2 wherein said partitions are located in said data storage drive and one or more additional data storage drives, said one or more additional data storage drives located in said second data storage device.

6. The method of claim 5 wherein said data storage drive and said one or more additional data storage drives comprise hard disk drives.

7. A system for retaining operational functionality, said system comprising:
- a memory in said first data storage device;
- a software resident in said memory; and
- a processor used for executing said software, said operational functionality comprising providing access to one or more data pools after a data storage drive resident within a first data storage device is communicatively decoupled from said first data storage device and communicatively coupled into a second data storage device, wherein executing said software generates each of said one or more data pools by way of concatenating a plurality of partitions using:
  - dual partition tables of said data storage drive, said dual partition tables comprising a first partition table and a second partition table, said first partition table being a mirror image of said second partition table, said dual partition tables used to specify each of said partitions in said data storage drive, wherein either said first partition table or said second partition table is made active by way of a flag located in a disk header of said data storage drive; and
  - dual pool information data blocks within each of said partitions, said dual pool information data blocks comprising a first pool information data block and a second pool information data block, said first pool information data block being a mirror image of said second pool information block, said dual pool information data blocks used for identifying and concatenating said partitions to construct said each of said one or more data pools.

8. The system of claim 7 wherein said operational functionality further comprises using one or more parameters stored within said memory, said one or more parameters used to assign data storage space to a data pool of said one or more data pools.

9. The system of claim 8 wherein said data storage space comprises space from said data storage drive and one or more additional data storage drives.

10. The system of claim 9 wherein said data storage drive and said one or more additional data storage drives comprises hard disk drives.

11. The system of claim 7 wherein said operational functionality further comprises using a database stored within a data storage drive, wherein said database is used after said data storage drive is transferred from a first data storage device into a second data storage device, said database used for enabling or disabling one or more mechanisms by which share access occurs, said database stored as a text file within its corresponding data pool.

12. The system of claim 11 wherein said one or more mechanisms utilizes a network file system protocol.

13. The system of claim 11 wherein said one or more mechanisms utilizes an internal file system protocol.

14. The system of claim 11 wherein said one or more mechanisms utilizes a file transfer protocol.

15. The system of claim 7 wherein updating said dual pool information data blocks comprises modifying said first pool information data block while said second pool information data block is left intact such that said second pool information data block may be accessed.

* * * * *